July 7, 1942.  R. J. THOMPSON  2,288,757
APPARATUS FOR DISPOSING OF GARBAGE
Filed March 28, 1938  2 Sheets-Sheet 2

Roy Joseph Thompson
INVENTOR
BY Victor J. Evans & Co.
ATTORNEYS

Patented July 7, 1942

2,288,757

UNITED STATES PATENT OFFICE 2,288,757

APPARATUS FOR DISPOSING OF GARBAGE

Roy Joseph Thompson, Michigan City, Ind., assignor to Edward Henry Vurpillat, Michigan City, Ind.

Application March 28, 1938, Serial No. 198,593

3 Claims. (Cl. 23—259.3)

This invention relates to a method and apparatus for treating garbage, sewage and other waste matter.

The invention has for its principal object to provide for a rapid and effective sanitary disposal of vegetable or animal waste matter and refuse such as city garbage and sewage by bacterial action and decomposition and subjection to sequential artificial chemical treatment whereby to convert the material into valuable products or by-products.

Another object is to produce a practical apparatus for carrying out the process which is substantially automatic or self-acting in character and involves a minimum of mechanically operated parts and which is leak-tight and odorless as well as efficient in operation.

Generally stated, the invention broadly comprehends the preparation of the material for treatment by mechanically or otherwise breaking it into fine particles, passing it initially into a receiving chamber containing a characteristic porous and absorptive composition, subjecting the material to bacterial action in said chamber to separate the gaseous elements from the solids, precipitating and retaining the solids and thence conducting the gases through a series of additional chambers each containing a different characteristic material for sequentially reconverting and changing the constituency of the treated substance and recovering the various gaseous and solid products therefrom.

More specifically, the invention consists in the particular details of the process and the structure of the apparatus employed as hereinafter described and set forth in the appended claims.

Figure 1:
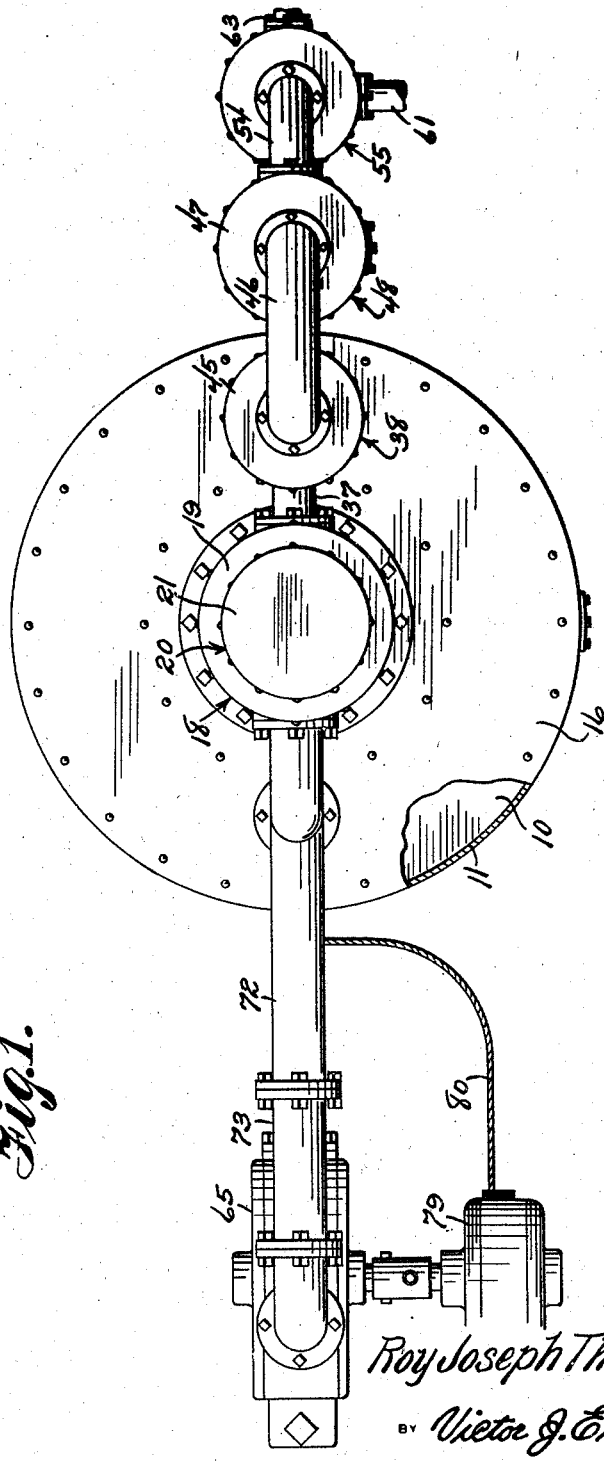
Figure 2:
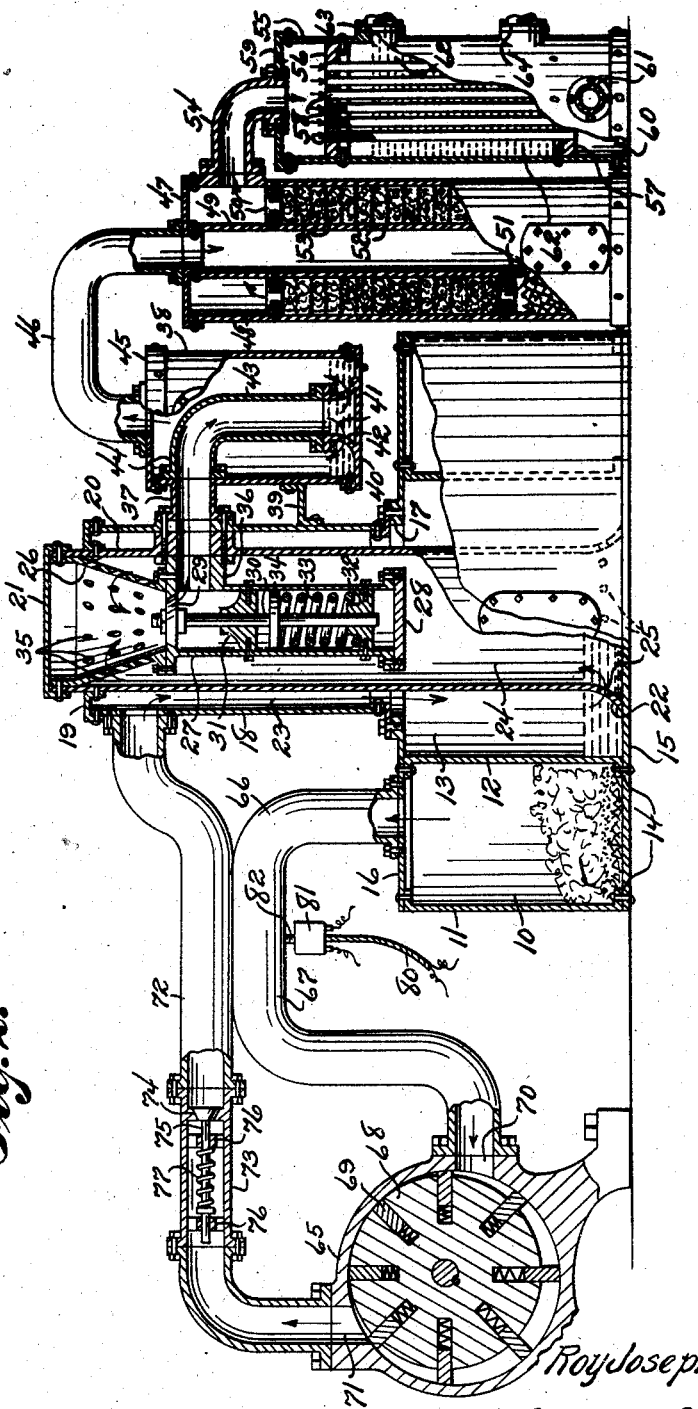

The accompanying drawings illustrate an apparatus for carrying out the process of the present invention, in which Figure 1 is a top plan view; and Figure 2 is a view partly in side elevation and partly in longitudinal section.

Referring now to the drawings, the apparatus therein shown comprises an annular main receiving chamber or compartment 10 which, as shown, has a cylindrical outer wall 11 and an inner cylindrical wall 12 which separates said chamber or compartment 10 from an inner cylindrical chamber 13, said wall portions 11 and 12 being attached at their lower flanged marginal portions, as at 14, to a bottom closure plate 15 with leak-tight effect throughout. Said chambers 10 and 13 are closed at their upper ends by a common plate 16 which is provided with a central opening 17, surrounding which is an upstanding cylindrical extension 18 having an annular closure plate 19 at its upper end, the inner marginal portion of said anular plate 19 being attached to a tubular column 20, the upper end of which extends above said annular plate 19 and is closed by cover plate 21, said column 20 extending down concentrically through the outer cylindrical extension 18 to the bottom plate 15 where it is flared, as at 22, and welded or otherwise attached to said plate 15.

The inner tubular column 20 provides an annular upper space 23 which communicates with the lower inner chamber 13 and provides an elongated cylindrical chamber 24 extending upwardly from the center of said chamber 13, communication being established between said chambers 13 and 24 through an annular series of apertures 25 provided in the flared lower end portion 22 of said inner cylindrical shell 20.

Secured within the upper end portion of the inner cylindrical shell 20 is an inverted frusto-conical or funnel shaped hollow valve-supporting element 26, to the contracted lower end portion of which is attached a cylindrical valve housing 27 which is closed at its lower end by a removable head 28. At the upper end of the cylindrical housing 27 is an internal annular seat for a valve 29, said valve having a stem portion 30 which is slidable in the upper and lower guide members 31 and 32, respectively, in said housing 27, and said valve 29 being normally urged into engagement with its seat by a spring element 33 which is interposed between the lower guide 32 and a collar 34 provided on the stem 30 adjacent the under side of the upper guide 31 and in sufficiently spaced relation to said guide to permit ample closing movement of the valve 29.

The hollow valve supporting element 26 is provided with a multiplicity of openings 35 in its tapered wall, and, preferably, said openings are formed vertically through said wall portion to minimize flow resistance therethrough, said openings 35 providing the outlet of said elongated central chamber 24 under the control of the spring pressed valve 29.

Extending laterally from the side of the valve cylinder 27 below the valve 29 is a nipple extension 36 which is fastened to the adjacent wall portion of the cylindrical shell 20 of said inner chamber 24 and communicates with a pipe coupling 37 externally of the outer cylindrical shell 18 through registered openings provided in the adjacent wall portions of said inner shell 20 and outer shell 18.

As shown, the coupling 37 is an integral part of and supports the upper portion of a cylindrical housing 38 whose lower portion is supported on a bracket extension 39 from the shell 18. The cylindrical housing 38 is closed at its lower end by a head 40 having a tapered collar 41 located centrally thereof on its inner side and provided with a series of openings 42 therein. Extending upwardly from this collar portion 41 is a pipe 43 having an elbow 44 at its upper end attached communicably to the nipple 37 with a leak-tight fit so that communication between said nipple 37 and the interior of the housing 38 is had only through the lower apertures 42, said housing 38 being closed at its upper end by a head 45 which is centrally apertured and connected by an arched pipe 46 to a centrally apertured upper end closure 47 of a cylindrical chamber 48, said chamber 48 having an axial tubular column 49 depending from said upper end closure 47 in communication with the pipe connection 46.

Surrounding said tubular column 49 and interposed between upper and lower supports 50, 51, is a series of screen elements 52 between which is a filling of steel wool or metal shavings 53, there being storage space below the open lower end of said column 49 for a characteristic chemical composition to be later described.

Leading from the upper portion of the housing 48 above the screen elements 52, is a pipe 54 which communicates with the upper end of a cooling and condensing unit 55, said unit 55 comprising a cylindrical housing having upper and lower retaining heads 56 and 57 providing a water chamber 62 between them, said heads being connected by longitudinal tubes 58, which are fitted at their ends in said heads 56 and 57 with leak-tight effect and establishing communication between the upper and lower chambers 59, 60, in said housing of the cooling and condensing unit, the lower chamber 60 having an outlet 61, and the water chamber 62 between the heads 56 and 57 having a water inlet 63 and a water outlet 64 or other provision for circulating a body of water through said chamber 62.

Leading from the top of the annular main receiving chamber or compartment 10 to a pump 65 is a pipe 66, the intermediate portion of said pipe being arched, as at 67. The pump 65 may be of any suitable suction or blower type, but as shown, includes a cylindrical casing having an eccentrically mounted circular rotor 68 therein, said rotor having spring pressed blade elements 69 working radially from the circumference thereof and engaging the inner cylindrical face of the casing. For this type of pump the pipe 66 communicates with the pump casing through a circumferential opening 70, while from an angularly opposed opening 71 in said pump casing a pipe 72 leads to the upper portion of the upper cylindrical extension 18 of the inner chamber or compartment 13.

Located within an intermediate section 73 of the pipe 72 is a check valve 74 which opens in the direction away from the pump 65 and towards the housing 18, said valve having a stem portion 75 which is slidably supported in guides 76 provided therefor in said pipe section 73 and said valve being normally retracted to its seat by a spring 77 sleeved about said stem portion 75 between the support 76 adjacent the valve head and a collar 78 provided on said stem portion 75 near the opposite support 76.

For the purposes of the present invention, the pump 65 is preferably operated by an electric motor 79 (see Figure 1), said motor being connected as at 80 in circuit with a controlling switch device 81 which latter is merely illustrated conventionally in Figure 2. Without detailed illustration of parts it is deemed sufficient to state that the switch device 81 is of the type that is operated by fluid pressure and for this purpose it has a lateral pipe connection 82 with arched portion 67 of the pipe 66 which connects the main chamber or compartment 10 with the pump 65, said switch device including a diaphragm (not shown) in its operating mechanism and connected to the circuit closing elements of the switch so that, normally, when the pressure in the pipe 66 is below a given degree the diaphragm holds the circuit closing elements in open position but when the pressure is appreciably increased in the pipe 66 the diaphragm is operated to effect the closing of the circuit and starting the motor 79 and operating the pump 65 to draw the gaseous contents from the upper portion of the chamber or compartment 10 and force it through the pipe 72 into the upper extension 18 of the central chamber or compartment 13.

The foregoing described apparatus is ideal for the purpose of carrying out the process of the present invention which will now be described.

In accordance with the process, the waste material or refuse to be treated or processed is first broken up or reduced to relatively fine particles by suitable mechanical means, which means, of itself, forms no part of the present invention and may include any one of numerous devices that are now well known and available for the purpose. Such device, for example, including a series of roller elements provided with spikes or other breaking and cutting formations between which the material to be treated is passed and then fed to the annular main chamber or compartment 10 by gravity or pumping means.

After a predetermined quantity of the material is supplied to the chamber or compartment 10, it is closed so that there is no other outlet except through the upper pipe connection 66 to the pump 65. Obviously, due to the different original characteristic properties of the various kinds of vegetable and animal matter in the mixture which is fed into the chamber or compartment 10, correspondingly different gaseous elements are driven off by the bacterial action during the process of decomposition of the mixture, and, in this connection, as a part of the first step of the process of the present invention, a quantity of crushed absorbent material of a particular character such as coke or sandstone or a mixture thereof is placed in the bottom of the chamber or compartment 10 for the purpose of retaining most of the bacteria and also for absorbing and holding any solid matter that is not affected by the bacterial action and carried off with the liberated gases, it being understood that the saturated absorbent material is removed from the chamber or compartment 10 from time to time, after a definite treatment has been carried on, to be treated for destruction of the contained bacteria, and disease germs or the recovery of elements of commercial value therefrom.

During the breaking down of the waste material by decomposition and bacterial action within the chamber or compartment 10, numerous gases composed of molecules and atoms of the various ingredients of animal and vegetable matter of the mixture under treatment are repelled and separated through the action of the bacteria and such gases are built up under pressure in the upper portion of the chamber or compartment 10 and in the pipe connection 66 to the pump 65. After pressure rises to a certain degree the diaphram or pressure-controlled means in the electrical switch element 81 is acted upon to close the circuit for the electric motor 79 and the pump 65 is thereby operated to draw the gaseous elements from said chamber or compartment 10 and force it through the pipe connection 72 into the annular upper chamber 23 and its communicating lower inner chamber 13, the pump 65 continuing to operate until the gas pressure in the chamber or compartment 10 falls to a degree where the controlling means of the switch element 81 reacts to open the motor circuit and stop operation of the pump, the gaseous elements which have been driven into the communicating upper and lower chambers 23 and 13 then being held therein by the check valve 74 in the pipe connection 72.

In the communicating bottom parts of the lower inner chamber or compartment 13 and the concentric upstanding elongated chamber 24 is placed a body of sulphuric acid, the level of which is above the annular series of openings 25 in the cylindrical shell 20. As the pressure is built up in said communicating upper and lower chambers or compartments 23 and 13 during the operation of the pump 65, the gaseous elements are forced through the solution of sulphuric acid and the communicating openings 25 into the vertically elongated chamber 24.

During this part of the process such living organisms that are carried from the initial container 10 along with the liberated gases are killed, and by the contact and attachment of the molecules of the elements of said gases with those of the sulphuric acid, there is a material change in the character of the gaseous matter, certain of the changed elements remaining in the acid solution and the others passing upwardly through the chamber or compartment 24 and under considerable pressure due to the heat which is generated by chemical action at this stage of the process.

When the pressure is sufficient to open the valve 29 the gases in the chamber 24 are passed out through the apertured funnel-shaped supporting element 26 and the pipe connection 37 into the center pipe 43 of the container 38, which latter has a body of nitric acid in the lower portion thereof and through which the gases must pass and be again changed in character. During this stage of the process certain elements are retained in the body of nitric acid and the others pass upwardly through the chamber 38 and through the pipe 46 leading therefrom to the next converting chamber 48.

As the gaseous elements from the chamber or compartment 38 pass from the pipe 46 and through the axial pipe 49 in said chamber or compartment 48 they are first carried into contact with a body of lime hydrate at the bottom of the chamber or compartment and are thereby again changed in character. The gases thus changed then pass upwardly through the body of metal shavings or steel wool and out of the chamber or compartment 48 through the pipe 54 into the cooling and condensing element 55.

The gases that finally pass through the tubes 58 which are surrounded by the water in the cooling and condensing unit 55 are thereby liquefied and eventually drawn off from the lower chamber 60 through the pipe 61 to be stored or immediately treated in a separate apparatus or device for further conversion or recovery of valuable products therefrom.

It is here noted that in addition to making provision for the removal of the saturated coke, sandstone or other porous and absorbent material from the initial treating chamber or compartment 10 for the destruction of disease germs and bacteria therein or the recovery of desirable products of commercial value therefrom, provision is likewise made for the removal of the sulphuric acid from the chambers or compartments 13 and 24 and also the nitric acid from the chamber or compartment 38, either by means of plugged drainage openings in the bottom of the respective chambers or compartments or by suitable means of access through the side walls thereof, it being obvious that numerous valuable products are recovered from either of said acid solutions, such, for example, as dyes of many different colors from gas treated by the sulphuric acid solution or from the solution itself which has thus been utilized in carrying out the process of reduction and disposal of the waste matter in accordance with the process of the present invention, while from the nitric acid treatment of the gas or that solution itself valuable nitrates or like characteristic substances are recovered, such, for example, as fertilizers and explosives. So, too, valuable characteristic products are recoverable by removing and treating the residue of the metallic shavings or steel wool which has been utilized as the filtering medium for the gases in the last stage of the process, because, as a result the contact of the gases with said metal shavings or steel wool, the latter is dissolved or disintegrated to a considerable degree and changed in character due to the chemical action and heat generated during the passage of the gases therethrough. It is also possible to utilize the residue of the lime hydrate for valuable commercial purposes after it is used in said chamber or compartment 48 of the apparatus in carrying out the process of the present invention.

From the foregoing, it is seen that waste matter and refuse, such as garbage and sewage, is not only rapidly disposed of in a practical and sanitary manner to overcome the annoyance of disagreeable odors as well as destroying disease germs and bacteria, but numerous products of commercial value for various uses are recoverable either directly during the process of reduction and disposal of the waste matter or by the subsequent treatment of products or substances taken from the apparatus at different stages in the process.

What is claimed is:

1. In an apparatus for the reduction and disposal of garbage and the like, comprising a container having an annular outer material receiving space and a central gas space, a cylindrical extension communicating with the central gas space and having a closed upper end, a pump communicating with the annular material receiving space and discharging the gases therefrom into the upper end of the cylindrical extension, a column carried by the upper closed end of the cylindrical extension and extending into the central gas space to the lower end thereof and having openings communicating therewith at its lower end, a discharge pipe communicating with the upper end of the column and extending outwardly through the cylindrical extension, a chamber communicating with the outer end of the discharge pipe, and a pressure control valve controlling the discharge of the gas from the column.

2. In an apparatus for the reduction and disposal of garbage and the like, comprising a container having an annular outer material receiving space and a central gas space, a cylindrical extension communicating with the central gas space and having a closed upper end, a pipe communicating with the upper end of the annular material receiving space and the upper end of the cylindrical extension, a pump interposed in said pipe, a pressure control means in the pipe intermediate the pump and the annular material receiving space for controlling the pump, a column carried by the upper closed end of the cylindrical extension and spaced therefrom and extending into the central gas space to the lower end thereof and having openings communicating therewith at its lower end below the fluid level therein, a discharge pipe communicating with the upper end of the column and extending outwardly through the cylindrical extension, a treatment chamber communicating with the outer end of the discharge pipe, and a pressure control valve within the column for controlling the discharge of the gas from the column through the pipe.

3. In an apparatus for the reduction and disposal of garbage and the like, comprising a container having an annular outer material receiving space and a central gas space, a cylindrical extension communicating with the central gas space and having a closed upper end, a pipe communicating with the upper end of the annular material receiving space and the upper end of the cylindrical extension, a pump interposed in said pipe, a pressure control means in the pipe intermediate the pump and the annular material receiving space for controlling the pump, a column carried by the upper closed end of the cylindrical extension and spaced therefrom and extending downwardly into the gas space to the lower end thereof and having openings communicating therewith at its lower end below the fluid level therein, a discharge pipe communicating with the upper end of the column and extending outwardly through the cylindrical extension, a treatment chamber communicating with the outer end of the discharge pipe, a valve cage supported by the column, a spring pressed valve in said cage controlling the discharge of the gas from the column through the inner end of the pipe.

ROY JOSEPH THOMPSON.